(12) United States Patent
Cha et al.

(10) Patent No.: US 9,376,062 B2
(45) Date of Patent: Jun. 28, 2016

(54) CARRIER APPARATUS FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR); Young Sub Oh, Suwon-si (KR); Soo Hyun Hyun, Gyeongju-si (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 14/549,853

(22) Filed: Nov. 21, 2014

(65) Prior Publication Data

US 2016/0052457 A1 Feb. 25, 2016

(30) Foreign Application Priority Data

Aug. 19, 2014 (KR) .................. 10-2014-0107779

(51) Int. Cl.
*B60R 19/48* (2006.01)
*B60R 9/06* (2006.01)
*B60R 9/10* (2006.01)

(52) U.S. Cl.
CPC .... *B60R 9/06* (2013.01); *B60R 9/10* (2013.01)

(58) Field of Classification Search
CPC .......... B60R 9/10; B60R 19/06; B60R 19/48; Y10S 224/924
See application file for complete search history.

(56) References Cited

U.S. PATENT DOCUMENTS

| | | | | |
|---|---|---|---|---|
| 5,445,300 A * | 8/1995 | Eipper | ...................... | B60R 9/06 224/496 |
| 7,909,213 B2 * | 3/2011 | Bergerhoff | ................ | B60R 9/10 224/197 |
| 7,992,751 B1 * | 8/2011 | Sweeney | ................... | B60R 9/06 224/497 |
| 9,174,584 B1 * | 11/2015 | Cha | ........................... | B60R 9/10 |
| 2007/0090142 A1 * | 4/2007 | Chuang | ..................... | B60P 3/07 224/496 |
| 2008/0142559 A1 | 6/2008 | Lim et al. | | |
| 2010/0001029 A1 * | 1/2010 | Tai | ........................... | B60R 9/06 224/499 |
| 2011/0108592 A1 * | 5/2011 | Lee | ........................... | B60R 9/06 224/488 |
| 2012/0024923 A1 * | 2/2012 | Cha | ........................... | B60R 9/06 224/533 |
| 2015/0165981 A1 * | 6/2015 | Kim | ......................... | B60R 9/06 224/512 |
| 2016/0052458 A1 * | 2/2016 | Cha | ......................... | B60R 9/10 414/462 |

FOREIGN PATENT DOCUMENTS

| | | |
|---|---|---|
| EP | 2570305 A2 | 3/2013 |
| JP | 11-028983 A | 2/1999 |
| JP | 2008-013175 A | 1/2008 |
| KR | 10-2011-0034733 A | 4/2011 |
| KR | 10-2011-0050162 A | 5/2011 |
| KR | 10-2013-0036913 A | 4/2013 |

* cited by examiner

*Primary Examiner* — Brian D Nash
(74) *Attorney, Agent, or Firm* — Morgan, Lewis & Bockius LLP

(57) ABSTRACT

A carrier apparatus for a vehicle may include guide rails, a carrier, an extending bar, an extending linkage, a support unit and lamps. The guide rails may be symmetrically disposed under a rear bumper beam and extend in a front-rear direction. The carrier may have a panel and sliding rails and be stowed in or drawn out from the rear bumper beam. The extending bar may be coupled to a driving unit disposed on a front of the carrier and extend rearward from the driving unit and be connected to the panel. The extending linkage may include a plurality of links on the the extending bar which open laterally away from the extending bar when the driving unit operates. The support unit may be connected to the links and moves laterally with the links. The lamps may be mounted on the support unit and slide laterally with the support unit.

9 Claims, 5 Drawing Sheets

CARRIER APPARATUS FOR VEHICLE

CROSS REFERENCE TO RELATED APPLICATION

The present application claims priority of Korean Patent Application Number 10-2014-0107779 filed on Aug. 19, 2014, the entire contents of which application are incorporated herein for all purposes by this reference.

BACKGROUND

1. Technical Field

The present invention relates to a carrier disposed on the rear bumper of a vehicle to load a bicycle or packages, and more particularly, to a carrier apparatus for a vehicle which is stowed in a rear bumper beam when not in use, but is drawn out and capable of tilting in that position to load a bicycle on a vehicle.

2. Description of the Related Art

Recently, as people use bicycles for leisure activities, they load bicycles on vehicles to carry them around bicycle-only roads or mountains.

However, bicycles are generally large in volume, so they are difficult to be loaded even using the trunk or the backseat space of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause a safety accident due to the bicycle caught to a tunnel or a building, when the vehicle enters the structures.

In the case of a bicycle mounted on the tailgate of a vehicle, complex installation is required for a specific carrier device; and the carrier device remains visible even when there is no bicycle mounted thereon, thereby detracting from the external appearance of a vehicle. Further, there is trouble that it is required to install the carrier device to load a bicycle and to separate the carrier device, when a bicycle is not loaded, thus decreasing convenience.

The information disclosed in this Background section is only for enhancement of understanding of the general background of the invention and should not be taken as an acknowledgement or any form of suggestion that this information forms the prior art already known to a person skilled in the art.

SUMMARY

The present invention has been made in an effort to solve the above drawbacks and/or other problems, and the present invention is to provide a carrier apparatus for a vehicle which is disposed inside a rear bumper beam of a vehicle, is not exposed to the outside when not in use, and can keep the external appearance of the vehicle and improve convenience by automatically being drawn out of a rear bumper beam so that a bicycle can be loaded, when the bicycle loading is desired.

In various aspects, the present invention provides a carrier apparatus for a vehicle, which includes: guide rails that are substantially symmetrically disposed under a rear bumper beam and extend in a front-rear direction; a carrier that has a panel and sliding rails extending from both sides of the panel to the corresponding guide rails and is stowed in or drawn out from the rear bumper beam by sliding in the front-rear direction along the guide rails; an extending bar that is coupled to a driving unit disposed on a front of the carrier and extends rearward from the driving unit and is connected to the panel; an extending linkage that is composed of a plurality of links on the extending bar and opens the links laterally away from the extending bar when the driving unit operates; a support unit that is connected to the links of the extending linkage and moves laterally with the extending linkage; and lamps that are mounted on the support unit at both sides of the panel and slide laterally with the support unit.

The extending linkage may include a pair of links substantially symmetrically disposed with the extending bar therebetween, and first ends of the pair of the links may be connected to the extending bar and second ends of the pair of the links are connected to the support unit.

The extending bar may include a lead screw and the first ends of the pair of the links of the extending linkage may be connected to the extending bar through a lead nut.

The support unit may include movable members to which the second ends of the pair of the links of the extending linkage are hinged and support members disposed on the movable members and laterally elongated to support wheels of a bicycle.

Lamps may be mounted on the support members of the support unit through connecting brackets extending rearward.

The carrier may include an extending rail that extends across the sliding rails and the movable members of the support unit may be disposed on the extending rail and capable of sliding laterally along the extending rail.

Recessed lamp seats may be formed at both side portions of the panel and open to both sides of the panel to receive the lamps.

Driving bars extending laterally to the sliding rails may be connected to the driving unit, power from the driving unit may be transmitted through the driving bars, and the carrier may slide along the guide rails.

Pinion gears may be disposed on extending ends of the driving bars and rack gears extending in the front-rear direction may be disposed on the guide rails, so that as the driving bars are rotated by the driving unit, the pinion gears may move on the rack gears.

According to the carrier apparatus for a vehicle of the present invention, the carrier is installed inside a rear bumper beam at the rear of a vehicle, so it is not exposed to the outside when not in use, but automatically slides out from the rear bumper beam to load a bicycle, and therefore, the external appearance is maintained and convenience is also improved.

Further, since auxiliary lamps that are disposed on the rear of the carrier so that the driver in a vehicle behind can recognize the carrier drawn out and they are stowed in or drawn out from the carrier, the installation space is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrating the accompanying drawings which are given hereinbelow by way of illustration only, and thus are not limitative of the present invention, and wherein.

Figure 1:
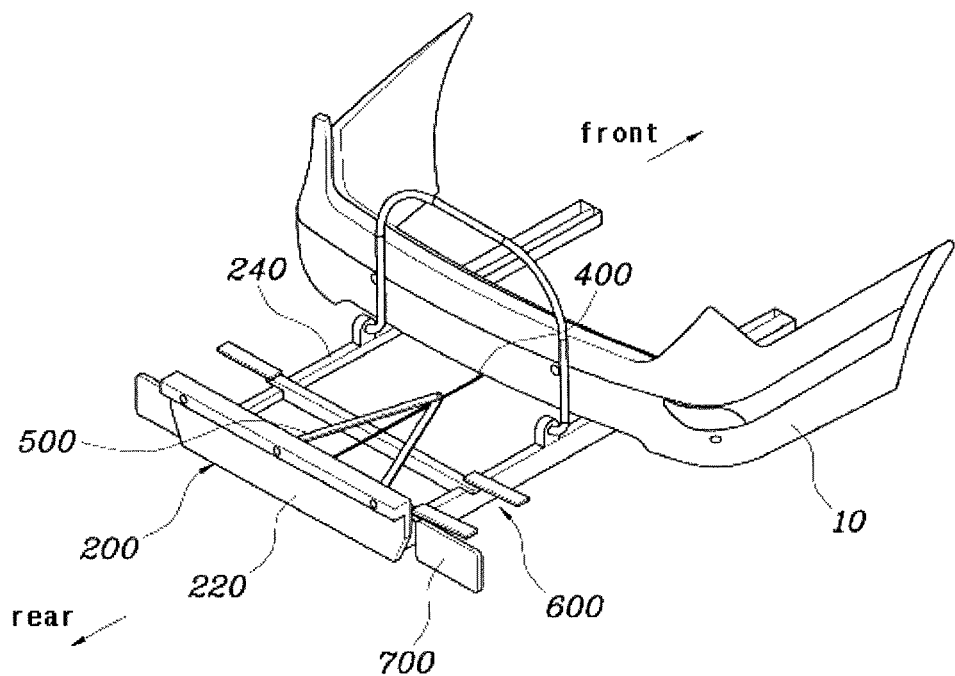
FIG. 1 is a perspective view of a carrier apparatus for a vehicle according to an embodiment of the present invention.
Figure 2:
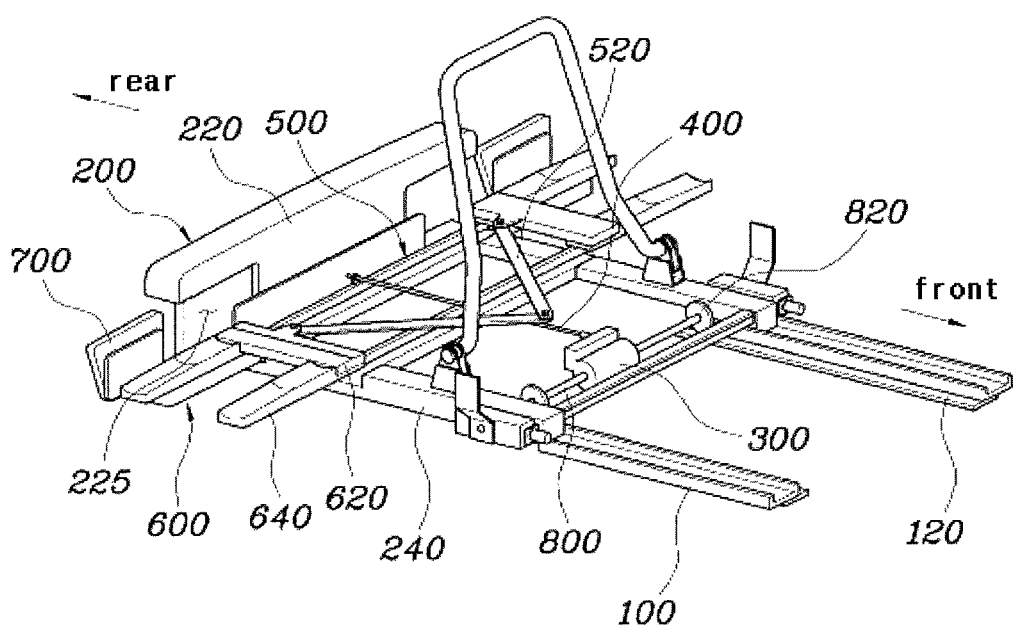
FIG. 2, FIG. 3, FIG. 4 and FIG. 5 are views illustrating the carrier apparatus for a vehicle shown in FIG. 1.
Figure 3:
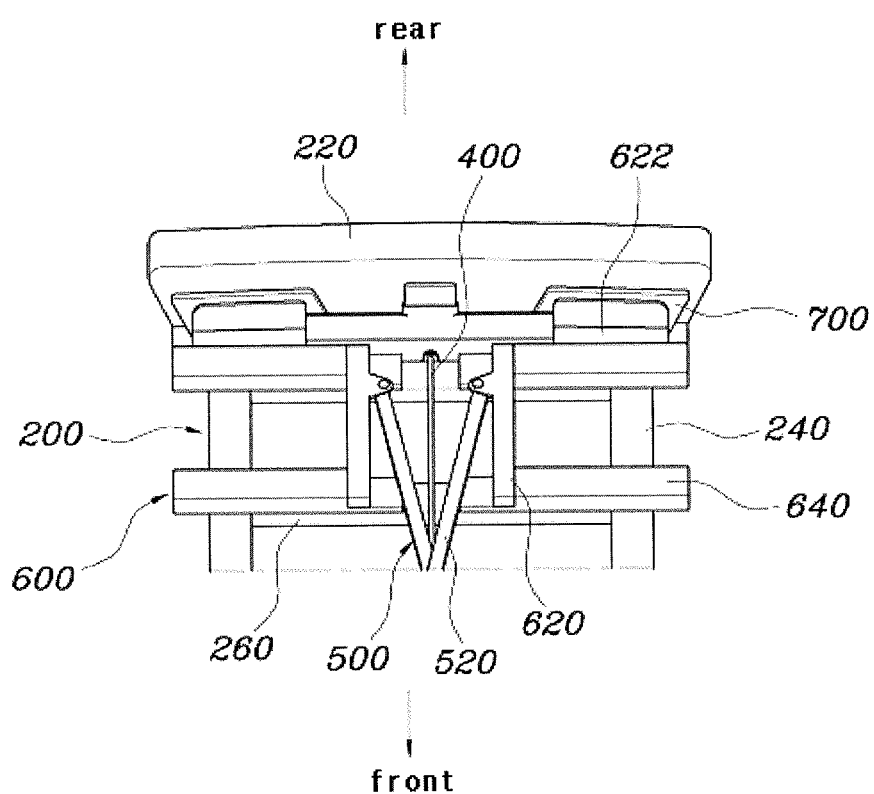
Figure 4:
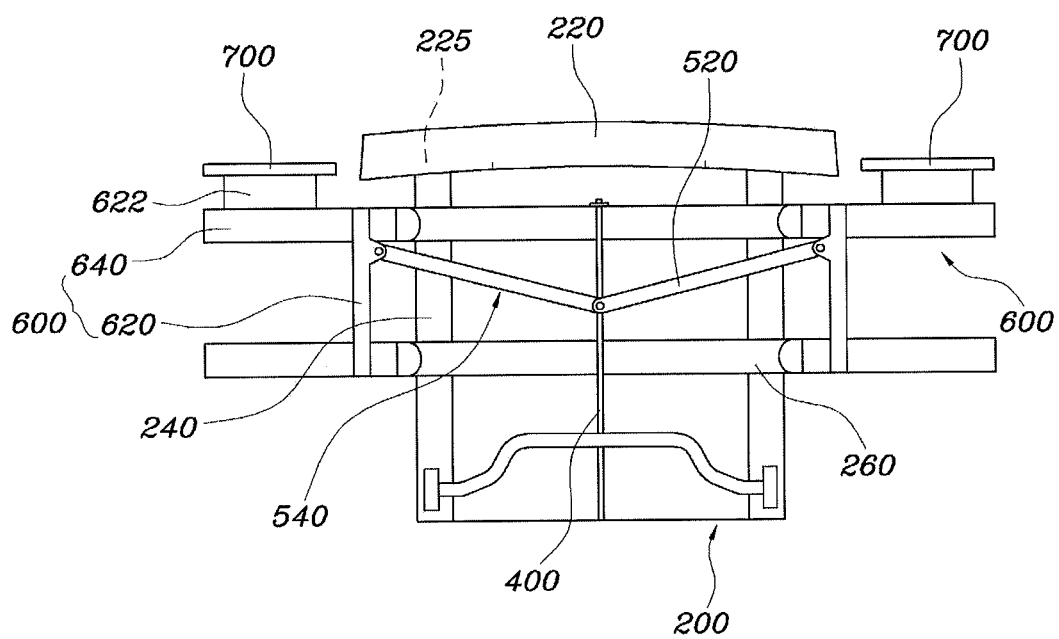
Figure 5:
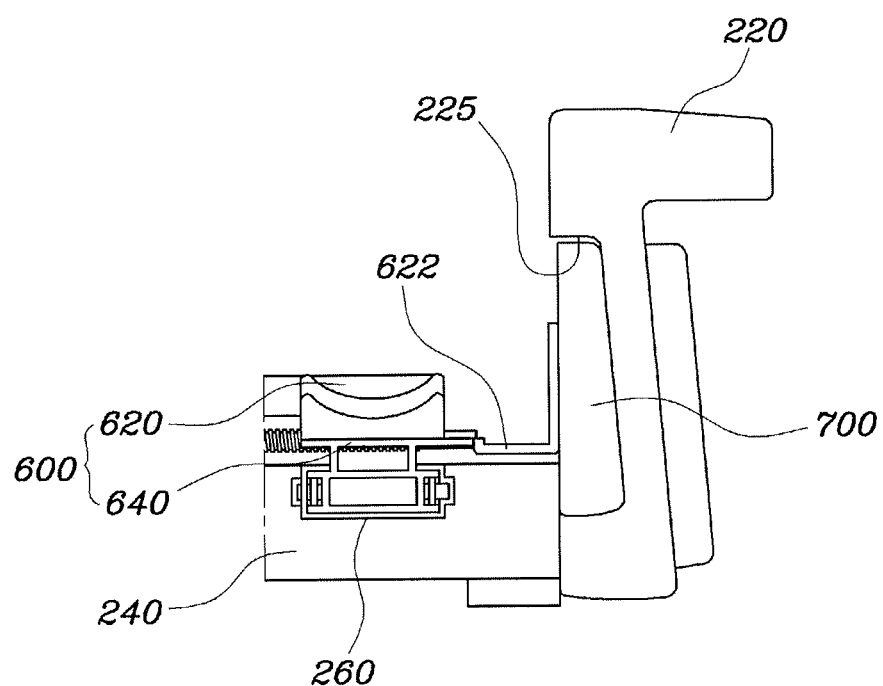

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a carrier apparatus for a vehicle according to various embodiments of the present invention is described with reference to the accompanying drawings.

FIG. 1 is a perspective view of a carrier apparatus for a vehicle according to an embodiment of the present invention and FIG. 2, FIG. 3, FIG. 4 and FIG. 5 are views illustrating the carrier apparatus for a vehicle shown in FIG. 1.

A carrier apparatus for a vehicle of the present invention includes: guide rails 100 that are symmetrically or substantially symmetrically disposed under a rear bumper beam 10 and extend in the front-rear direction; a carrier 200 that has a panel 220 and sliding rails 240 extending from both sides of the panel 220 to the guide rails 100 and is stowed in or drawn out from the rear bumper beam 10 by sliding in the front-rear direction along the guide rails 100; an extending bar 400 that extends rearward from a driving unit 300 on the front of the carrier 200 and is connected to the panel 220; an extending linkage 500 that is composed of a plurality of links 520 on the extending bar 400 and opens the links 520 laterally away from the extending bar 400 when the driving unit 300 operates; a support unit 600 that is connected to the links 520 of the extending linkage 500 and moves laterally with the links 520; and lamps 700 that are mounted on the support unit 600 at both sides of the panel 220 and slide laterally with the support unit 600.

The carrier apparatus of the present invention may be installed inside the rear bumper beam 10 at the rear of a vehicle, and may be stowed in or drawn out from the rear bumper beam 10 or stowed or drawn out from under the rear bumper beam 10.

Since the carrier apparatus is stowed in and drawn out from the rear bumper beam 10 of a vehicle, its exposure to the outside is minimized without detraction of the design from installation of the carrier apparatus and breakdown of the carrier apparatus due to dirt is prevented.

The guide rails 100 are fixed symmetrically or substantially symmetrically at both sides of the rear bumper beam 10, extending in the front-rear direction. That is, the carrier apparatus is stowed in or drawn out from the rear bumper beam 10 by sliding along the guide rails 100.

The carrier 200 has a panel 220 on the same plane as the rear bumper beam 10 and the sliding rails 240 extending rearward from both sides of the panel 220 are connected to the guide rails 100. That is, as the sliding rails 240 of the carrier 200 move along the guide rails, the carrier apparatus is stowed or drawn out.

In the present invention, while the carrier 200 is drawn out, the support unit 600 laterally extends to fix a bicycle that is loaded after the carrier 200 is drawn out.

To this end, there are provided the driving unit 300 disposed on the front of the carrier 200, the extending bar 400 extending rearward from the driving unit 300 and connected to the panel 220, and the extending linkage 500 composed of a plurality of links 520 on the extending bar 400 and laterally opening the links 520 away from the extending bar 400 when the driving unit 300 operates.

The support unit 600 on the sliding rails 240 of the carrier 200 is connected to the links 520 of the extending linkage 500 so that the extending linkage 500 is deployed when it laterally moves with the links 520.

That is, when the driving unit 300 operates, first ends of the links 520 connected to the extending bar 400 move in the front-rear direction, second ends of the links 520 laterally open away from the extending bar 400, and the support unit 600 connected to the second ends of the links 520 laterally moves, so a bicycle can be loaded.

In particular, the present invention includes the lamps 700 disposed on the support unit 600 and capable of sliding with the support unit 600 laterally from both sides of the panel 220, and the lamps 700 are exposed to the outside, when the carrier 200 is drawn out and then the support unit 600 extends.

Accordingly, the driver of a vehicle behind can recognize the carrier 200 drawn out and safely drive.

In detail, the extending linkage 500 is composed of a pair of links 520 symmetrically or substantially symmetrically disposed with the extending bar 400 therebetween, and the first ends of the links 520 are connected to the extending bar 400 and the second ends are connected to the support unit 600.

The extending bar 400 may be a lead screw and the first ends of the pair of links 520 of the extending linkage 500 may be connected to the extending bar 400, for example, through a lead nut.

As described herein, since the extending bar 400 is a lead screw and the first ends of the links 520 of the extending linkage 500 are connected to the extending bar 400 by a lead nut, when the extending bar 400 is rotated by operating the driving unit 300, the lead nut connected with the first ends of the links 520 can move in the front-rear direction along the extending bar 400.

The support unit 600 may be composed of movable members 620 to which the second ends of the links 520 of the extending linkage 500 are hinged and support members 640 disposed on the movable members 620 and laterally elongated to support the wheels of a bicycle.

As described herein, since the second ends of the links 520 of the extending linkage 500 are hinged to the movable member 620 of the support unit 600, when the driving unit 300 is operated, the gap between the links 520 changes and the movable members 620 laterally move, resulting in lateral extension of the support members 640 on the movable members 620.

The support 600 is disposed on the sliding rails 240 of the carrier 200 to slide only to both sides, the second ends of the extending linkage 500 can move only to both sides, not in the front-rear direction, and the first ends of the extending linkage 500 are connected to the extending bar 400 and can move only in the front-rear direction. Accordingly, when the driving unit 300 operates and power is transmitted to the extending bar 400, the second end of the extending linkage 500 moves forward or rearward and its first end moves inward or outward, so the support unit 600 laterally extend.

The carrier 200 includes an extending rail 260 extending across the sliding rails 240 and the movable members 620 of the support unit 600 are disposed on the extending rail 260 and capable of sliding laterally along the extending rail 260.

Since the carrier 200 includes the extending rail 260 extending to connect the sliding rails 240, the support unit 600 can laterally extend along the extending rail 260 so that a bicycle can be loaded.

The tops of the support members 640, where the wheels of a bicycle are placed, may be curved so that the wheels of a bicycle can be firmly fixed on the support members 640 by specific fixing members.

The lamps 700 may be mounted on the support members 640 of the support unit 600, which laterally extends, through connecting brackets 622 extending rearward.

That is, the support members 640 of the support unit 600 are connected to the movable members 620 connected with the second ends of the links 520 of the extending linkage 500, so they laterally move with the movable members 620 when the driving unit 300 operates. Accordingly, since the lamps 700 are mounted on the support members, they also laterally move when the support unit 600 extends.

Therefore, when the support unit 600 laterally extends, after the carrier 200 is drawn out, the lamps 700 are exposed out of the panel 220 with the support unit 600, so the driver in a vehicle behind can recognize the carrier 200 protruding.

Recessed lamp seats 225 may be formed at both side portions of the panel 220 and open to both sides of the panel 220 to receive the lamps 700.

Accordingly, when the support unit 600 does not extend, the lamps 700 are positioned in the lamp seats 225 of the panel 220, so the spaces for the lamps 700 can be minimized, but when the support unit 600 extends, the lamps 700 laterally slide out from the panel 220 to be exposed to the outside, thereby achieving a high-quality product.

Driving bars 800 extending laterally to the sliding rails 240 are connected to the driving unit 300 and power from the driving unit 300 is transmitted through the driving bars 800, so the carrier 200 can slide along the guide rails 100.

In detail, pinion gears 820 are disposed on the extending ends of the driving bars 800 and rack gears 120 extending in the front-rear direction are disposed on the guide rails 100, so that as the driving bars 800 are rotated by the driving unit 300, the pinion gears 820 can move on the rack gears 120.

That is, the rack gears 120 are elongated in the front-rear direction on the guide rails 100 and the pinion gears 820 engaged with the rack gears 120 are disposed on the driving bars 800 extending from the driving unit 300, so that as the driving unit 300 is operated, the driving bars 800 are rotated and the pinion gears 820 are rotated with the rotation of the driving bars 800, and accordingly the carrier 200 is moved along the rack gears 120.

Further, the guide rails 100 may be provided with solenoids selectively allowing the carrier 200 to slide out by being selectively connected to the sliding rails 240 of the carrier 200 so that sliding of the carrier 200 is controlled.

The solenoids may be operated in combination with the driving unit 300 and may be separated from the carrier 200 such that the carrier 200 can slide, when the carrier 200 is drawn out, so that the carrier 200 can be stowed or drawn out.

The driving unit 300 may include two motors connected to the extending bar 400 and the driving bars 800, respectively, because it is supposed to supply power through the extending bar 400 and the driving bars 800, or it may be possible to use one motor selectively connected to the extending bar 400 and the driving bars 800 by changing the length of a driven shaft.

In the operation of the carrier apparatus for a vehicle of the present invention, the carrier is stowed in the rear bumper beam 10, not exposed to the outside, when not in use.

In order to load a bicycle, a user activates the driving unit 300 through a specific switch. The switch may be disposed on a tail gate or around the driver's seat, and as the switch is activated, the driving unit is operated.

As the driving bars 800 rotate, the pinion gears 820 rotate and the rack gears 120 engaged with the pinion gears 820 move, so that the sliding rails 240 of the carrier 200 move rearward along the guide rails 100.

When the carrier 200 is fully drawn out of the rear bumper beam 10, the extending bar 400 is rotated by the power from the driving unit 300 and the first ends of the links 520 of the extending linkage 500 are moved rearward. Accordingly, the second ends of the links 520 connected to the support unit 600 open outward, so the support unit 600 laterally extend so that a bicycle can be loaded.

In particular, since the lamps 700 are mounted on the support members 640 of the support unit 600 in the present invention, the lamps 700 slides out of the lamp seats 225 of the panel 220 to be exposed to the outside, when the support unit 600 extends.

The carrier apparatus is stowed in the reverse order of the drawing-out described herein.

According to the carrier apparatus for a vehicle of the present invention, the carrier is installed inside the rear bumper beam 10 at the rear of a vehicle, so it is not exposed to the outside when not in use, but automatically slides out from the rear bumper beam 10 to load a vehicle, and therefore, the external appearance is maintained and convenience is also improved.

Further, since the auxiliary lamps are disposed on the rear of the carrier 200 so that the driver in a vehicle behind can recognize the carrier 200 drawn out and they are stowed in or drawn out from the carrier 200, the installation space is reduced.

For convenience in explanation and accurate definition in the appended claims, the terms "front" or "rear", "inward" or "outward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carrier apparatus for a vehicle, comprising:
   guide rails that are substantially symmetrically disposed under a rear bumper beam and extend in a front-rear direction;
   a carrier that has a panel and sliding rails extending from both sides of the panel to the corresponding guide rails and is stowed in or drawn out from the rear bumper beam by sliding in the front-rear direction along the guide rails;
   an extending bar that is coupled to a driving unit disposed on a front of the carrier and extends rearward from the driving unit and is connected to the panel;
   an extending linkage that is composed of a plurality of links on the extending bar and opens the links laterally away from the extending bar when the driving unit operates;
   a support unit that is connected to the links of the extending linkage and moves laterally with the links; and
   lamps that are mounted on the support unit at both sides of the panel and slide laterally with the support unit.

2. The carrier apparatus for a vehicle of claim 1, wherein the extending linkage includes a pair of links substantially symmetrically disposed with the extending bar therebetween, and first ends of the pair of the links are connected to the extending bar and second ends of the pair of the links are connected to the support unit.

3. The carrier apparatus for a vehicle of claim 2, wherein the extending bar includes a lead screw and the first ends of the pair of the links of the extending linkage are connected to the extending bar through a lead nut.

4. The carrier apparatus for a vehicle of claim 2, wherein the support unit includes movable members to which the second ends of the pair of the links of the extending linkage are hinged and support members disposed on the movable members and laterally elongated to support wheels of a bicycle.

5. The carrier apparatus for a vehicle of claim 4, wherein lamps are mounted on the support members of the support unit through connecting brackets extending rearward.

6. The carrier apparatus for a vehicle of claim 4, wherein the carrier includes an extending rail that extends across the sliding rails and the movable members of the support unit are disposed on the extending rail and capable of sliding laterally along the extending rail.

7. The carrier apparatus for a vehicle of claim 1, wherein recessed lamp seats are formed at both side portions of the panel and open to both sides of the panel to receive the lamps.

8. The carrier apparatus for a vehicle of claim 1, wherein driving bars extending laterally to the sliding rails are connected to the driving unit, power from the driving unit is transmitted through the driving bars, and the carrier slides along the guide rails.

9. The carrier apparatus for a vehicle of claim 8, wherein pinion gears are disposed on extending ends of the driving bars, rack gears extending in the front-rear direction are disposed on the guide rails, and as the driving bars are rotated by the driving unit, the pinion gears move on the rack gears.

* * * * *